(12) United States Patent
Naruoka

(10) Patent No.: US 7,060,388 B2
(45) Date of Patent: Jun. 13, 2006

(54) NONAQUEOUS ELECTROLYTE SECONDARY BATTERY

(75) Inventor: Yoshinori Naruoka, Kyoto (JP)

(73) Assignee: Japan Storage Battery Co., Ltd., Kyoto (JP)

( * ) Notice: Subject to any disclaimer, the term of this patent is extended or adjusted under 35 U.S.C. 154(b) by 567 days.

(21) Appl. No.: 10/226,330

(22) Filed: Aug. 23, 2002

(65) Prior Publication Data

US 2003/0044677 A1    Mar. 6, 2003

(30) Foreign Application Priority Data

Aug. 24, 2001   (JP)   .............................. 2001-254956

(51) Int. Cl.
*H01M 2/20*    (2006.01)
*H01M 2/26*    (2006.01)

(52) U.S. Cl. ........................ 429/161; 429/122; 429/94; 429/169

(58) Field of Classification Search .................... 429/7, 429/94, 122, 161, 163, 165, 169
See application file for complete search history.

(56) References Cited

U.S. PATENT DOCUMENTS 5,989,743 A * 11/1999 Yamashita .................. 429/129

6,033,795 A * 3/2000 Broussely et al. ............ 429/56

FOREIGN PATENT DOCUMENTS

| JP | 6-318465 | 11/1994 |
|----|----------|---------|
| JP | 11-73996 | 3/1999 |
| JP | 11-176478 | 7/1999 |

* cited by examiner

*Primary Examiner*—Tracy Dove
(74) *Attorney, Agent, or Firm*—Wenderoth, Lind & Ponack, L.L.P.

(57) ABSTRACT

An electric power generating element of a battery is covered with an electric conductor including a positive conductor member electrically connected to a positive plate, a negative conductor member electrically connected to a negative plate, and a separating member. An electric resistance per unit length of at least one of the positive and negative conductor members is made smaller than that of positive and negative current collectors of the positive and negative plates electrically connected to the positive and negative conductor members, respectively. For example, by making a thickness of the positive conductor member larger than that of the positive current collector, the electric resistance per unit length of the positive conductor member is made smaller than that of the positive current collector. Accordingly, large current occurring during internal short-circuiting can be rapidly distributed between the positive and negative conductor members, and excessive heat generation of a battery is prevented.

16 Claims, 5 Drawing Sheets

US 7,060,388 B2

NONAQUEOUS ELECTROLYTE SECONDARY BATTERY

BACKGROUND OF THE INVENTION

1. Field of the Invention

The present invention relates to a nonaqueous electrolyte secondary battery.

2. Description of the Prior Art

In consideration of the recent prevalence of portable electric appliances such as cellular telephones, notebook-type personal computers, or the like, there has been a promotion in the development of those batteries which can meet the demand for making these appliances be miniaturized and be provided with a high capacity. Among such batteries, the lithium ion secondary battery (hereinafter, sometimes simply referred to as "a battery") is expected to meet such a demand since the lithium ion secondary battery has a high operating voltage and a high energy density.

Incidentally, since a lithium ion secondary battery is required to have such a high energy density as described above, a variety of mechanisms are adopted for the purpose of securing the safety of the battery in connection with its uses. In particular, a separator having a function to shut down at high temperatures, a PTC device increasing in resistance with increasing temperatures, or the like are available.

However, in a larger-sized secondary battery having a larger capacity, the chemical energy quantity which is stored in the battery becomes larger, and hence it is more important to secure the safety.

SUMMARY OF THE INVENTION

The present invention has been developed in view of the above described circumstances, and an object of the present invention is to provide a nonaqueous electrolyte secondary battery in which safety is secured even for an extraordinary occurrence such as a breakdown which is caused by external forces or the like.

When an internal short circuiting is caused by a breakdown due to external forces or the like, an extraordinarily large current is concentrated in the short circuited portion to generate the Joule heat and thereby elevate the temperature. In addition, sometimes the short-circuited portion comes across an instantaneous spark. Accompanying such a spark, reactions such as a thermal decomposition of the positive active material, a reaction between either the positive or negative electrode and the electrolyte, and the like occur, and herewith the safety valve is caused to operate and sometimes fume is released.

In order to prevent the occurrence of such excessive heat generation, it is effective to provide the outermost layer of an electric power generating element with a configuration in which the element is covered with an electric conductor, where the electric conductor comprises a positive conductor member which is electrically connected to a positive electrode and a negative conductor member which is electrically connected to a negative electrode. With such a configuration, the initial stage of a short-circuiting can be allowed to occur within a portion of the conductor member in which portion no highly reactive active material is present, and thus the thermal decomposition of the active materials and the accompanying excessive heat generation can be prevented.

In the case mentioned above, by making the electric resistance of each conductor member be smaller than that of the current collector, the large electric current which is caused by a short-circuiting can be rapidly distributed over the electric conductor member, which has been found to be further remarkably effective in preventing the excessive heat generation of a battery. The present invention has been developed on the basis of such novel findings.

That is, the nonaqueous electrolyte secondary battery of the present invention is provided with an electric power generating element and an electric conductor. The electric power generating element is formed by laminating a positive electrode which is provided with a positive current collector and a negative electrode which is provided with a negative current collector, with a separating member interposed therebetween. The nonaqueous electrolyte secondary battery is characterized in that the outermost layer of the electric power generating element is covered with the electric conductor. The electric conductor is formed by laminating a positive conductor member which is electrically connected to the positive electrode and a negative conductor member which is electrically connected to the negative electrode, with a separating member interposed therebetween. The electric conductor member is made to be smaller in electric resistance than the respective current collector in at least one of the positive electrode part and the negative electrode part.

According to the present invention, the electric power generating element of a battery is covered with a positive conductor member which is electrically connected to a positive electrode, and a negative conductor member which is electrically connected to a negative electrode. The electric resistance of the electric conductor member is made to be smaller than that of at least one of the respective current collectors. Thus, a large current accompanying a short-circuiting can be distributed in the electric conductor member, and as a result, a further remarkable effect can be achieved in preventing the excessive heat generation of a battery.

DETAILED DESCRIPTION OF THE INVENTION

Figure 1:
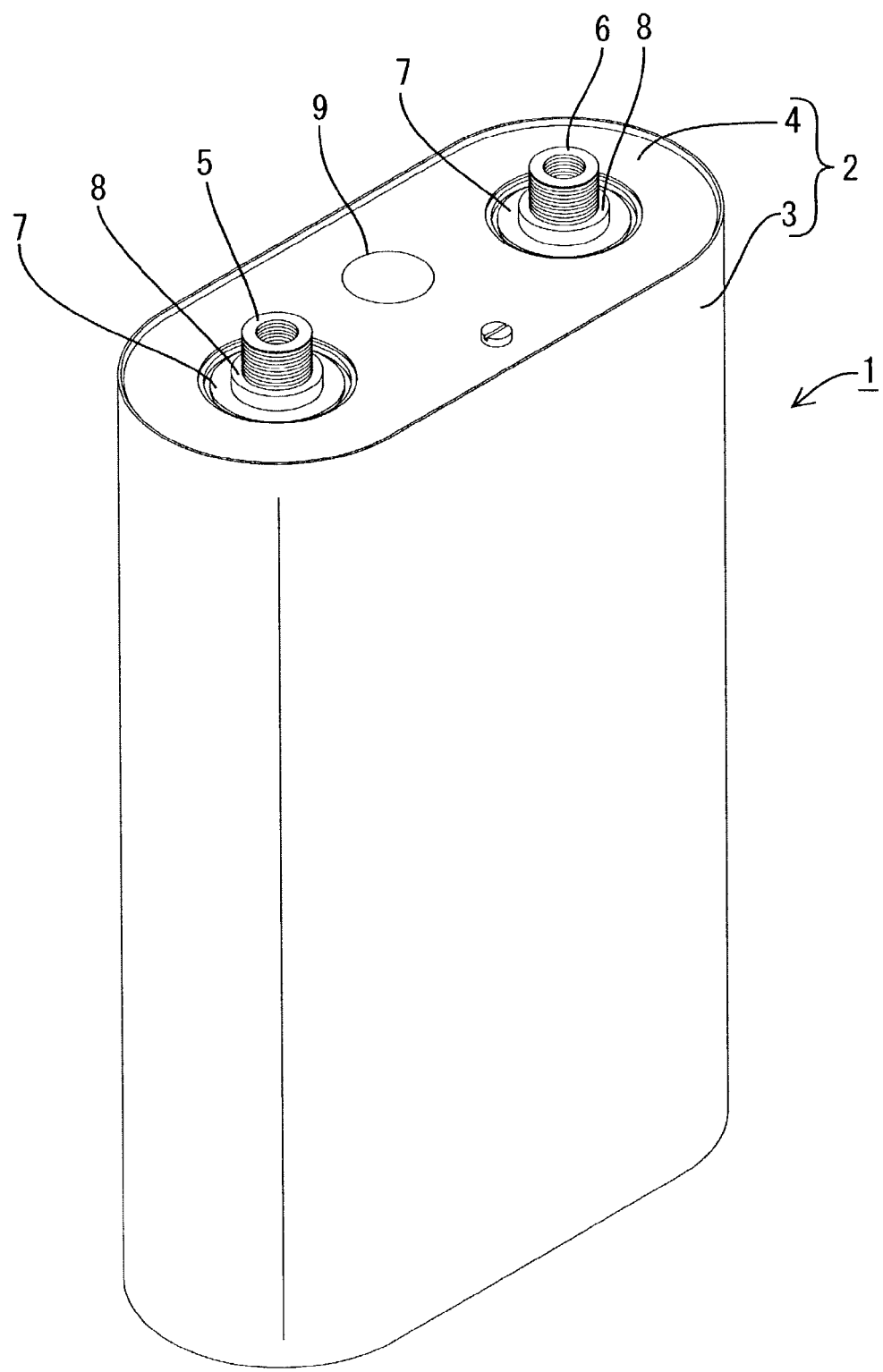
FIG. 1 is a perspective view of a battery of an embodiment of the present invention.

The nonaqueous electrolyte secondary battery of the present invention is provided with an electric power generating element. The electric power generating element is formed by laminating a positive electrode (plate) which is provided with a positive current collector and a negative electrode (plate) which is provided with a negative current collector, with a separating member interposed therebetween. The nonaqueous electrolyte secondary battery is characterized in that the outermost layer of the electric power generating element is covered with an electric conductor. The electric conductor is formed by laminating a positive conductor member which is electrically connected to the positive electrode and a negative conductor member which is electrically connected to the negative electrode, with another separating member interposed therebetween. At least one of the electric conductor members is made to be smaller in electric resistance than the respective current collector in at least one of the positive electrode part and the negative electrode part. Incidentally, as for the electric resistance of a current collector and that of an electric conductor member per unit length of the present invention, those resistance values per unit length which are measured for a certain definite width are compared.

As for the material for the conductor members of the positive and negative electrodes, there is no particular limitation, and any material which exhibits electric conductance can be used; for example, such metals as aluminum, copper, titanium, iron, or the like are used in a foil form. In particular, in the positive electrode part, the use of aluminum foil is preferable in view of the high electrochemical stability thereof at higher voltages.

In either or both of the positive and negative electrode parts, the electric conductor member may be made to be smaller in electric resistance than the respective current collectors. In order to make the electric conductor member smaller in electric resistance than the current collector, for example, a material which is smaller in electric resistance than the current collector may be used for the electric conductor member. Alternatively, a member which is made of the same material as that for the current collector and larger in thickness than the current collector may be used as the electric conductor member.

The use of a thicker electric conductor member is also effective in the point that the short-circuit current which is caused by a nail or the like that is driven into a battery can be rapidly distributed during the fairly long time period of time which is required for the tip of the nail to reach the positive and negative electrodes. Furthermore, the use of the above-described thicker member is also effective in the point that the electric conductor member is not easily fused and electrically disconnected even when the temperature is increased in the portion connecting the respective current collector and the positive or negative electrode (plate) wherein the short-circuit current is concentrated.

According to the present invention, the electric power generating element of a battery is covered with the positive conductor member which is electrically connected to the positive electrode and the negative conductor member which is electrically connected to the negative electrode, and the electric conductor members are smaller in electric resistance than the positive and negative current collectors. Consequently, a large electric current occurring during short-circuiting can be rapidly distributed, and therefore, a further remarkable effect is achieved in preventing the excessive heat generation of a battery.

Furthermore, the present invention is characterized in that the positive conductor member is electrically connected to the lead plate of the positive electrode in which one end is connected to the positive current collector and the other end is connected to a positive electrode terminal, while the negative conductor member is electrically connected to the lead plate of the negative electrode in which one end is connected to the negative current collector and the other end is connected to a negative electrode terminal.

According to the present invention, the electric power generating element of a battery is covered with a positive conductor member and a negative conductor member. In addition, the positive conductor member is electrically connected to the positive electrode plate, and the negative conductor member is electrically connected to the negative electrode plate. According to this construction, a large current occurring in an extraordinary situation can be rapidly distributed in the conductor members, and as a result, a remarkable effect can be achieved in suppressing the temperature elevation in the battery. In this case, if at least one of the positive conductor member and the negative conductor member is made to be lower in electric resistance than the respective positive and negative current collector, amore remarkable effect can be achieved in suppressing the temperature elevation.

In particular, the positive conductor member is preferably thicker than the positive current collector when aluminum foil is used for the positive current collector and the positive conductor member. In this way, even when the heat liberation is caused by the short-circuit current flowing in a concentrated manner, the fusion and disconnection of the conductor member of the positive electrode can be prevented in the portion where the positive conductor member is connected to the positive electrode. In addition, by making the electric conductor member thicker, when a nail or the like is driven into a battery, a fairly long period of time is required for the tip of the nail to reach the internal positive or negative electrode. Consequently, during such a period of time, the short-circuit current can be distributed by the electric conductor member so that the short-circuit current which is generated between the positive and negative electrodes can be made smaller. Thus, the prevention of the excessive heat generation of a battery can be made further reliable.

With reference to FIGS. 1 to 5, a detailed description of one embodiment of the present invention is presented in which a nonaqueous electrolyte secondary battery of the present invention has been implemented.

FIG. 1 shows a lithium ion secondary battery 1 in a completed form of the present embodiment (corresponding to a nonaqueous electrolyte secondary battery of the present invention; hereinafter, sometimes referred to as "battery 1"). The lithium ion secondary battery 1 comprises a casing 2 which is, for example, formed with a metal in an elliptic cylindrical shape, an electric power generating element 10 which is housed in the interior of the casing 2, and an electric conductor 20 which is wound with the electric power generating element 20.

The casing 2 is composed of a battery case 3 which is formed of a metal in a bottomed elliptic cylindrical container shape, and a metallic cover plate 4 which is formed in a nearly elliptical shape for sealing an opening of the battery case 3. The electric power generating element 10 is housed in the battery case 3, with two elliptical shaped insulator plates on the top and bottom thereof. The opening of the battery case 3 is sealed by welding the cover plate 4 to the battery case 3. A positive electrode terminal 5 and a negative electrode terminal 6, which are both made of a conductive material and of nearly a rod shape, are fixed around the center of the cover plate 4 in such a manner so as to pass through the cover plate 4. The positive and negative terminals 5 and 6 pass through two through-holes 7 which are formed on the cover plate 4, and are supported through insulating seals 8 by the cover plate 4 so as to be insulated from the cover plate 4. Incidentally, a safety valve 9 is arranged on the cover plate 4 by covering a through-hole with a metallic thin film.

A mixed solution of, for example, ethylene carbonate (EC), diethyl carbonate (DEC), and a dimethyl carbonate (DMC) in a ratio of 2:1:2, and an electrolyte with added lithium hexafluorophosphate in a concentration of 1 mol/l are charged into the interior of the casing 2.

Figure 2:
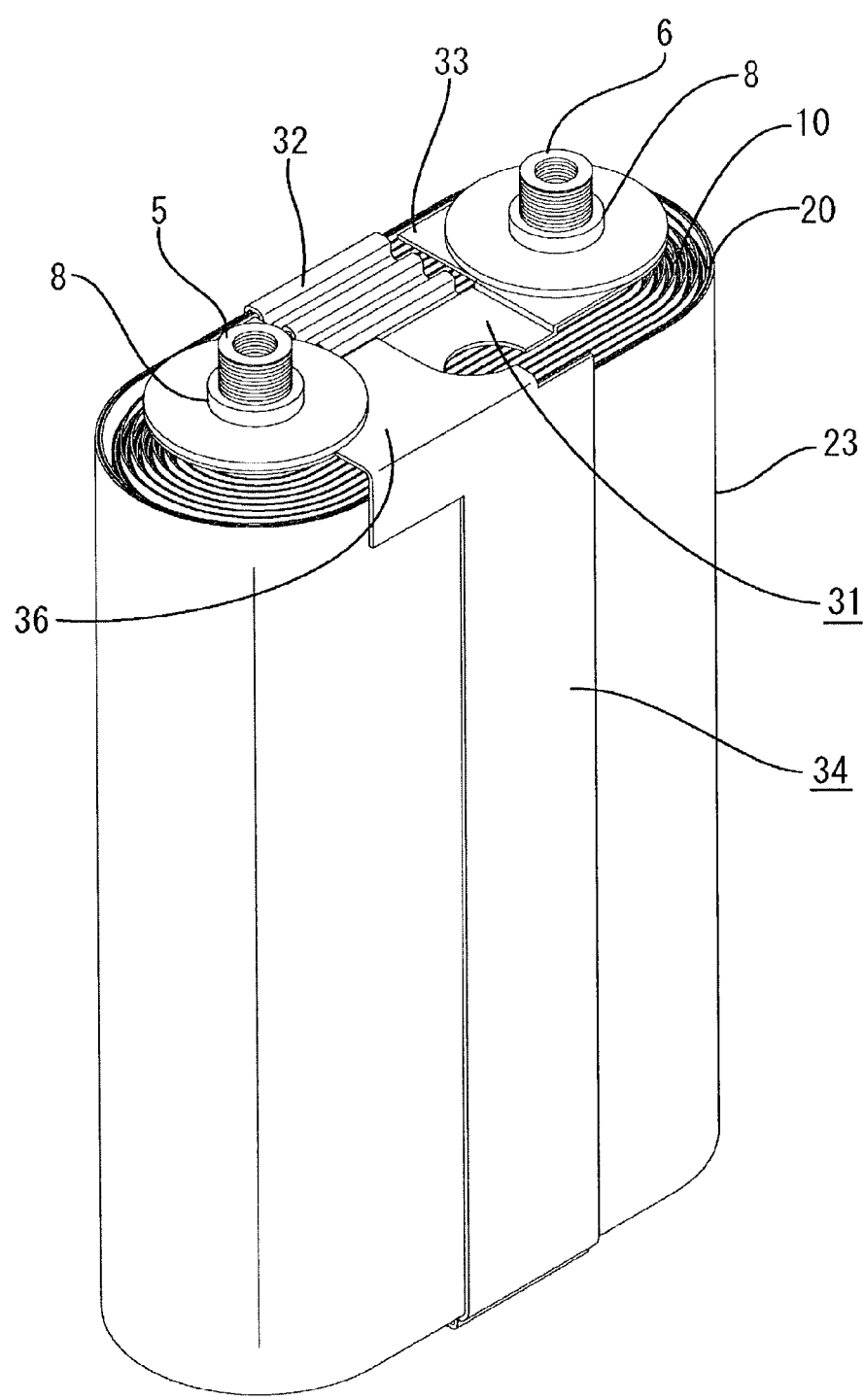
FIG. 2 is a perspective view of an electric power generating element and electric conductors which are wound together in an embodiment of the present invention.
Figure 3:
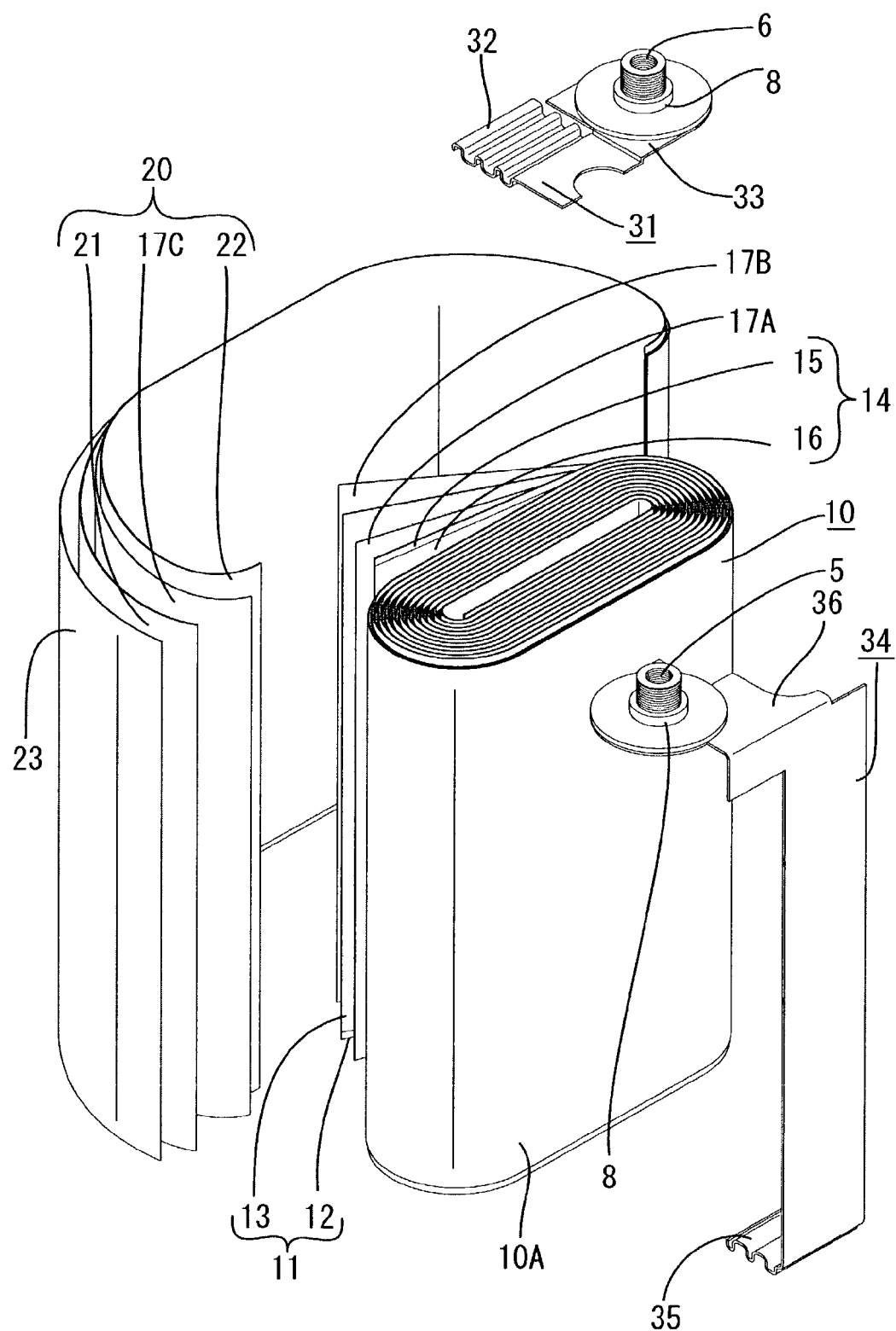
FIG. 3 is an exploded perspective view of the electric power generating element and the electric conductors in an embodiment of the present invention.
Figure 4:
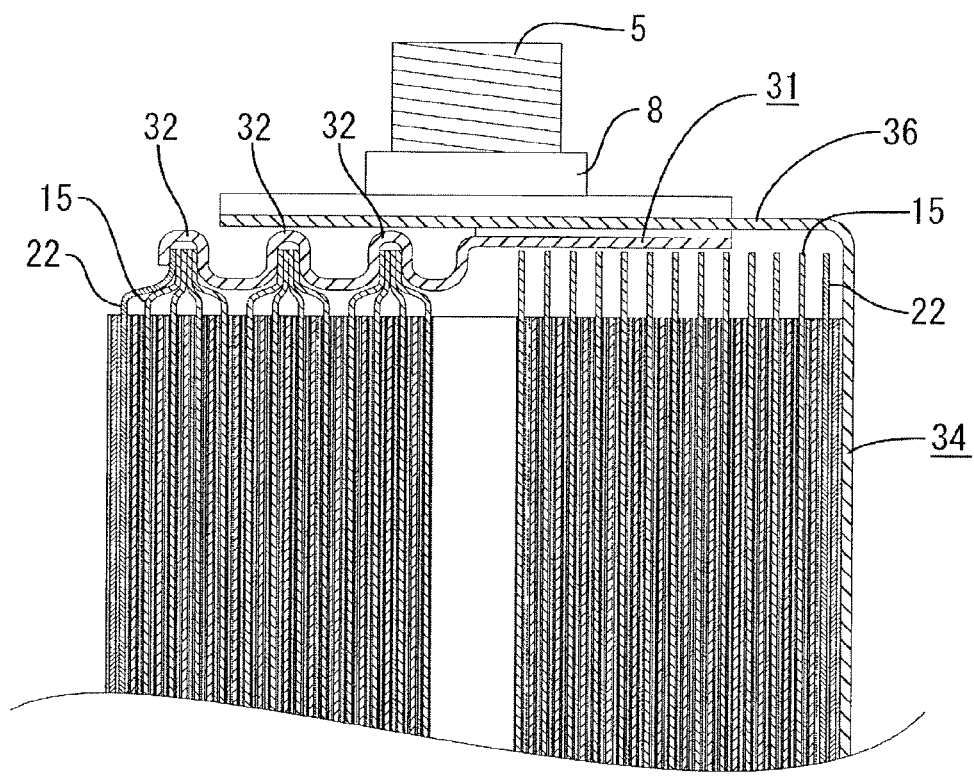
FIG. 4 is a sectional view of the battery of an embodiment of the present invention.
Figure 4:
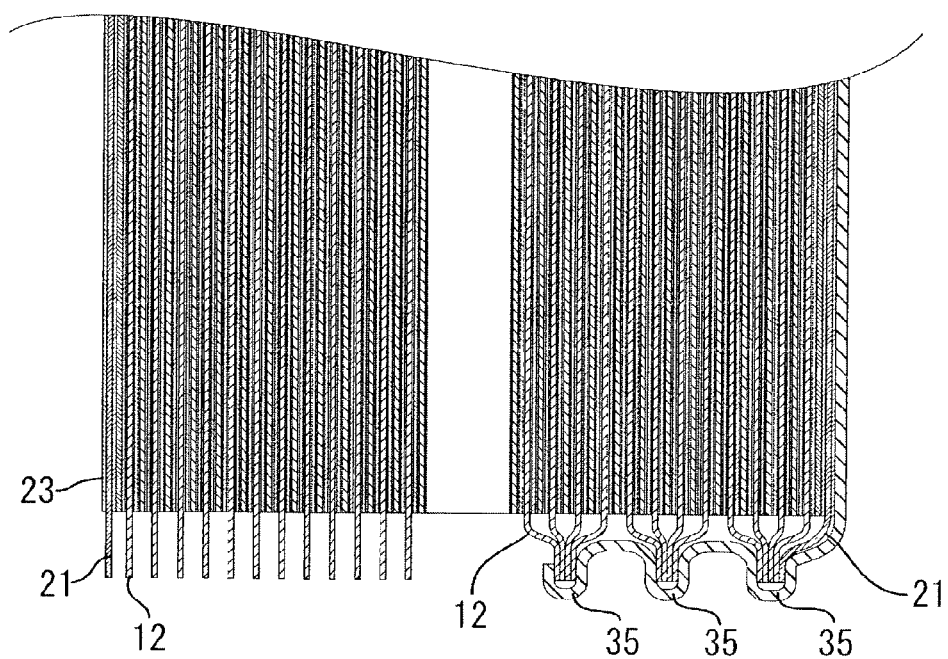
Figure 5:
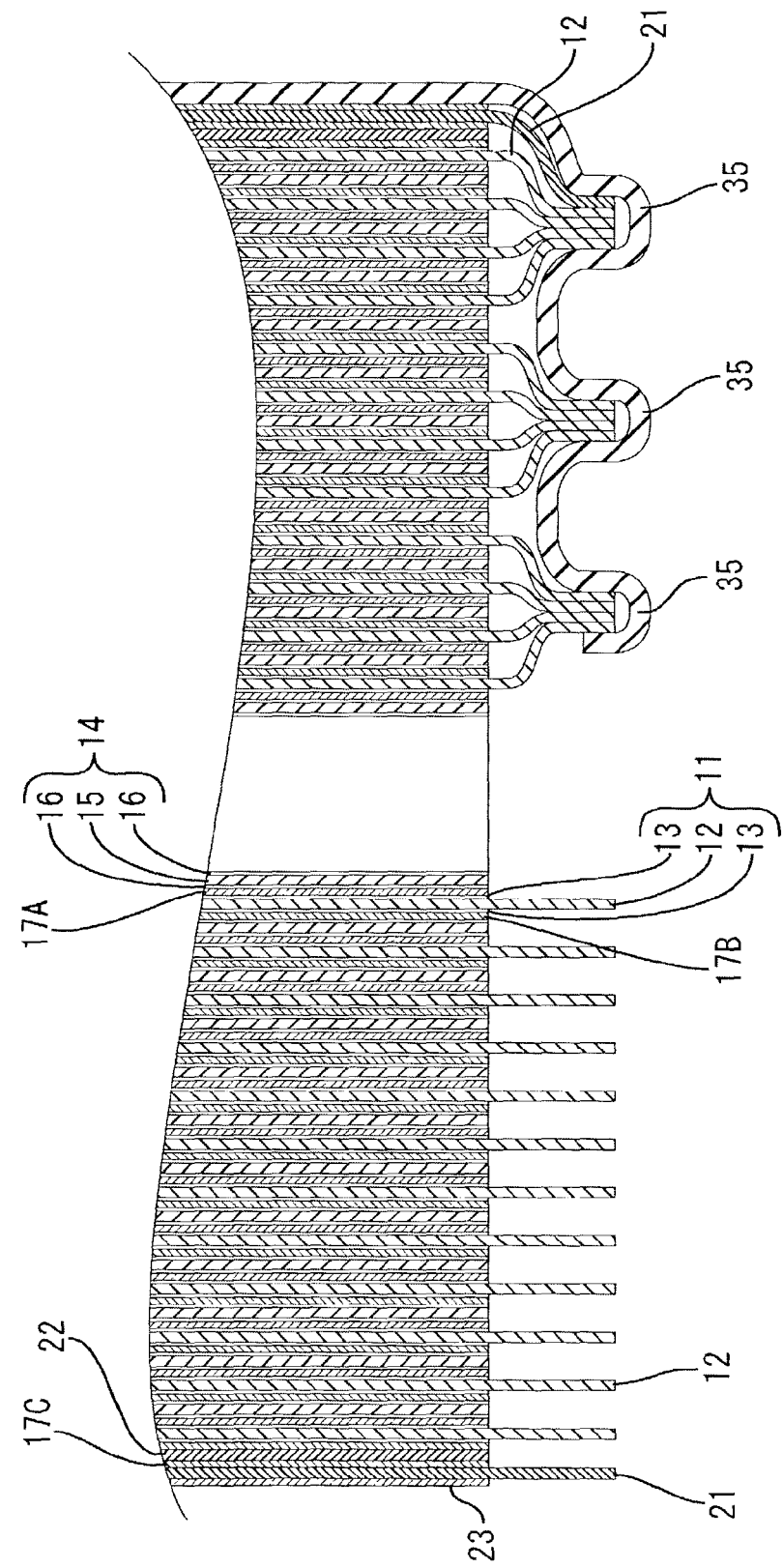
FIG. 5 is an enlarged sectional view of connected current collectors and electric conductors of the battery in an embodiment of the present invention.

The electric power generating element 10 has a configuration in which a belt-like positive plate 11 and a belt-like negative plate 14 are superposed on each other with a separator 17 (corresponding to a first separating member of the present invention) interposed therebetween, and are wound into a coreless shape (see FIGS. 2 and 3).

The positive plate 11 has a configuration in which a layer 13 of positive active material is formed on a positive current collector of 12 which is made of a belt-like shape of aluminum foil of 20 μm in thickness. The positive active material layer 13 is formed almost all over each of both side surfaces of the positive current collector 12 excluding a thin margin on one lengthwise edge whose side is to be the smaller end side when the positive plate is wound.

On the other hand, the negative plate 14 has a configuration in which a layer 16 of negative active material is formed on both the side surfaces of a negative current collector 15 which is made of a belt-like shape of copper foil of 16 μm in thickness. The negative active material layer 16 is formed almost all over both side surfaces of the negative current collector 15 excluding a thin margin on one lengthwise edge whose side is to be the upper end side when the negative plate is wound.

The positive and negative plates 11 and 14 are superposed on each other with separators 17 interposed therebetween which are made of polyethylene or polypropylene, and are wound to form the electric power generating element 10. In more detail, the superposition is made according to the order of the negative plate 14—the separator 17A—the positive plate 11—the separator 17B, and the winding is made with the negative plate 14 taking the inner side and with the outermost circumference taken by the exposed portion of the separator 17B. In this case, the negative plate 14 is superposed with a slight upward displacement, so that the upper edge margin which is provided with no negative active material layer 16 is made to protrude upward, while the positive plate 11 is superposed with a slight downward displacement, so that the smaller edge margin which is provided with no positive active material layer 13 is made to protrude downward.

The outer circumferential surface 10A of the electric power generating element 10 is covered with the electric conductor 20. The electric conductor 20 has a configuration in which a positive conductor member of 21 which is made of an aluminum foil of 50 μm in thickness and a negative conductor member 22 which is made of a copper foil of 16 μm in thickness are laminated on each other with a separator 17C interposed therebetween, which separator 17C corresponding to a second separating member of the present invention. The positive conductor member 21 is made to be larger in thickness than the positive current collector 12, so as to be smaller in electric resistance than the positive current collector 12. The electric conductor 20 is formed in a sheet shape as large as can cover in just proportion all over the outer circumferential surface 10A of the electric power generating element 10, and is wound around the outer circumferential surface 10A of the electric power generating element 10. Outside the electric conductor 20, a sheet of polyimide film 23 is wound for the purpose of insulating from the battery case 3.

A negative electrode lead plate 31 is fixed to the top end face of the electric power generating element 10. The negative electrode lead plate 31 is made of a strip of copper plate which is fabricated in a pleated form, and thus provided with a plurality of stripe-shaped terminal areas 32 comprising the pleats. To these terminal areas 32, the top end portion of the negative current collector 15 (where no negative active material layer 16 is formed) is inserted in a pinched form in such a way so that the top end portion is sectioned into a plurality of groups each comprising apparently several sheets and so that each one group is allotted to one terminal area (see FIGS. 4 and 5). In addition, the negative conductor member 22 is inserted in a pinched form together with the negative current collector 15 of the above-mentioned group into the terminal area 32 which is located in the outermost circumferential portion of the electric power generating element 10, so that the negative conductor member 22 and the negative current collector 15 are made to be electrically connected with each other. A piece of a terminal plate 33 is made to project from an end portion of the negative electrode lead plate 31, and the piece of terminal plate 33 is connected to the negative electrode terminal 6.

A positive electrode lead plate 34 is fixed to the bottom end face of the electric power generating element 10. The positive electrode lead plate 34 is made of a strip of a nickel plate which is fabricated in a pleated form similar to the case of the negative electrode lead plate 31, and thus is provided with a plurality of stripe-shaped terminal areas 35 comprising the pleats. To these terminal areas 35, the bottom end portion of the positive current collector 12 (where no positive active material layer 13 is formed) and the positive conductor member 21 are inserted in a pinched form similar to the case of the negative electrode side, so that the positive conductor member 21 and the positive current collector 12 are electrically connected with each other. A belt shape of an extension member 36 is arranged so as to abut the outer circumferential surface of the polyimide film 23 from one end portion of the positive electrode lead plate 34 and to reach a top portion of the battery, while the extension member 36 is also bent so as to abut the top end face of the electric power generating element 10 and is connected to the positive electrode terminal 5.

The operations and performances of a lithium ion secondary battery as constructed in the above-described manner will now be explained.

When the lithium ion secondary battery 1 is used normally, the separators 17 insulate the positive plate 11 and the negative plate 14 from each other, and to insulate the positive conductor member 21 and the negative conductor member 22 from each other.

When such an edged piece of metal as a nail or the like is driven into the battery 1, and its tip reaches the interior portion of the battery 1, short-circuiting occurs between the positive and negative electrodes. Here, the outer circumferential surface 10A of the electric power generating element 10 is covered with the electric conductor 20, and hence the nail reaches the electric conductor 20 first. Accordingly, short-circuiting occurs first of all between the positive conductor member 21 and the negative conductor member 22, and the short-circuit current flows. In this way, the initial short-circuiting is made to occur in the electric conductor 20 where the highly reactive active material layers 13 and 16 are not present, thereby suppressing the excessive heat generation of the battery 1.

Then, when the tip of a nail reaches the electric power generating element 10, the short-circuit current also starts to flow between the positive plate 11 and the negative plate 14. It should be noted that the positive conductor member 21 is 50 μm thick so as to be thicker than the positive current collector 12 (20 μm thick). That is, the positive conductor member 21 is made to be smaller in electric resistance than the positive current collector 12. Accordingly, most of the large current during short circuiting can be rapidly distributed with the aid of the electric conductor 20, and the current flowing between the positive plate 11 and the negative plate 14 can be made small. Herewith, a further remarkable effect can be achieved in preventing the excessive heat generation in the battery.

Since the positive conductor member 21 is made to be thicker, when a nail or the like is driven into the battery 1, it takes a fairly long period of time for its tip to reach the electrode plates 11 and 14. Therefore, during such a period of time, the short-circuit current can be distributed between the positive and negative conductor members 21 and 22, and the short-circuit current which is generated between the plates 11 and 14 can be made smaller. Herewith, the prevention of the excessive heat generation in the battery 1 can be made further reliable.

In addition, in both the positive and negative conductor members 21 and 22, the portions around the portions which are respectively connected to the lead plates 31 and 34 are possibly fused and electrically disconnected due to the heat that is generated by the concentrated current therein during short-circuiting. In particular, when aluminum is used as the material for the positive conductor member 21 is larger in electric resistance, accordingly higher in the possibility of generating heat, and more liable to be fused and electrically disconnected than when copper is used as the material for the negative conductor member 22. Thus, by making the positive conductor member 21 be thicker, the fusion and electric disconnection can be prevented, the short-circuit current can be reliably distributed over the electric conductor 20, and the excessive heat generation of the battery 1 can be prevented.

According to the present embodiment, as described above, the electric power generating element 10 of the battery 1 is covered with the electric conductor 20 comprising the positive conductor member 21 which is electrically connected to the positive plate 11 and the negative conductor member 22 which is electrically connected to the negative plate 14. In addition, the positive conductor member 21 is made to be larger in thickness than the positive current collector 12, so that the positive conductor member 21 is made to be smaller in the electric resistance per unit length than the positive current collector 12.

The electric resistance per unit length of the positive conductor member 21 is preferably made to be equal to or smaller than $2/3$ that of the positive current collector 12. Herewith, a large current during short-circuiting can be distributed between both the positive and negative conductor members 21 and 22, and accordingly, a remarkable effect can be achieved in preventing the excessive heat generation of the battery 1. Furthermore, when the electric resistance of the positive conductor member 21 is equal to or smaller than $1/2$ that of the positive current collector 12, the large current during short-circuiting can be more effectively distributed, and as a result, the temperature elevation in the short-circuited portion can be suppressed so that a more remarkable effect can be achieved in preventing the excessive heat generation.

Similar to the above, the electric resistance per unit length of the negative conductor member 22 is preferably made to be equal to or smaller than $1/2$ that of the negative current collector 15. Furthermore, for the purpose of rapid distribution of the large current during short-circuiting, the electric resistance per unit length of the positive conductor member 21 and that of the negative conductor member 22 are preferably equal to or smaller than $1/2$ the electric resistance per unit length of the positive current collector 12 and that of the negative current collector 15, respectively.

The electric resistance per unit length of the positive conductor member 21 to be equal to or smaller than $2/3$ or $1/2$ that of the positive current collector 12 can be realized by making the thickness of the positive conductor member 21 be 1.5 or more times, or even twice or more, than that of the positive current collector 12. Similarly, the electric resistance per unit length of the negative conductor member 22 to be equal to or smaller than $2/3$ or $1/2$ that of the negative current collector 15 can be realized by making the thickness of the negative conductor member 22 be 1.5 or more times, or even twice or more, than that of the negative current collector 15.

Furthermore, according to the present embodiment, the increased thickness of the positive conductor member 21 can serve to suppress the fusion which is followed by electric disconnection in the portion connected to the negative electrode lead plate 31, even when the heat is generated by the short-circuit current to flow in a concentrated manner. Furthermore, a fairly long period of time which is required for the tip of a nail or the like to reach the interior electrode plates 11 and 14 allows for the short-circuit current to be distributed between the positive and negative conductor members 21 and 22, thereby making the short-circuit current between the electrode plates 11 and 14 be smaller. Thus, the prevention of the excessive heat generation in the battery 1 can be made further reliable.

Incidentally, in the present embodiment, the electric conductor 20 is wound around the outer circumferential surface 10A of the electric power generating element 10, and a sheet of polyimide film 23 is wound around the outer surface of the electric conductor 20 thus wound. Alternatively, however, if the positive conductor member 21 is the outer component of the electric conductor 20 and the material for the positive conductor member 21 is the same as that for the casing 3, it is not necessary for the positive conductor member 21 to be insulated from the casing 3 by winding a sheet of polyimide film 23, but the positive conductor member 21 and the casing 3 may be electrically connected.

With reference to the following Examples, a more detailed description of the present invention is presented.

EXAMPLE 1

1. Fabrication of a Lithium Ion Secondary Battery
(1) Fabrication of a Negative Plate Graphite as an active material and poly(vinylidene fluoride) as a binder were mixed in a composition ratio of 90:10 together with N-methylpyrrolidone (NMP) as the solvent for dissolving the binder, to prepare a negative composite paste. The paste was applied uniformly onto all over the two side surfaces of a current collector which is made of a sheet of copper foil of 16 μm in thickness, and the sheet of copper foil was dried and pressed and cut out to fabricate a belt-like negative plate.

(2) Fabrication of a Positive Plate $LiNi_{0.55}Co_{0.15}Mn_{0.30}O_2$ as an active material, poly(vinylidene fluoride) as a binder, and acetylene black as an electric conductor agent were mixed in a composition ratio of 94:4:2 to prepare a positive composite paste. The paste was applied uniformly onto all over the two side surfaces of a current collector which is made of a sheet of aluminum foil of 20 μm in thickness, and a belt-like positive plate was fabricated in a manner similar to the case of the negative plate.

(3) Preparation of an Electrolyte

A nonaqueous solvent was prepared by mixing ethylene carbonate and diethyl carbonate in a volume ratio of 1:1. $LiPF_6$ as an electrolyte was dissolved in the nonaqueous solvent in a concentration of 1.0 mol/dm$^3$, to prepare a nonaqueous electrolyte.

(4) Fabrication of an Electric Conductor

A positive conductor member which is made of a sheet of aluminum foil of 50 μm in thickness and a negative conductor member which is made of a sheet of copper foil of 16 μm in thickness were laminated with a sheet of separator interposed therebetween to fabricate a belt-like electric conductor.

(5) Fabrication of a Battery

The positive plate, a separator made of polyethylene, the negative plate, and a separator made of polyethylene were laminated in this order, and were wound to fabricate an electric power generating element. The electric conductor was wound in a manner to come full circle around the outer circumferential surface of the electric power generating element. Furthermore, a sheet of polyimide film was wound around the outer circumferential surface of the electric conductor for the purpose of insulation. The positive current collector and the positive conductor member were electrically conductively connected by a positive electrode lead plate. Similarly, the negative current collector and the negative conductor member were electrically conductively connected by a negative electrode lead plate.

The electric power generating element was housed in a battery case made of aluminum. Then, the positive electrode lead plate and the negative electrode lead plate were respectively electrically connected to the positive and negative electrode terminals which were fixed to a cover plate. Subsequently, the cover plate was fixed to the battery case by means of laser welding. Finally, the electrolyte was charged into the battery case through a liquid feeding opening which was bored through the cover plate, and the opening was sealed by laser welding. The design capacity of the battery is 11.6 Ah, and as for the casing, the bottom surface is of the ellipse shape with the minor axis of 22 mm and the major axis of 60 mm, and the height is 100 mm.

A safety valve has been fixed to the cover plate of the casing, which valve is 8 mm in diameter, and the design opening pressure is 8 kgf/cm$^2$.

EXAMPLE 2

The battery of Example 2 was fabricated in the same manner as that in Example 1 except that a sheet of aluminum foil of 150 μm in thickness was used for the positive conductor member.

EXAMPLE 3

The battery of Example 3 was fabricated in the same manner as that in Example 1 except that a sheet of aluminum foil of 40 μm in thickness was used for the positive conductor member.

EXAMPLE 4

The battery of Example 4 was fabricated in the same manner as that in Example 1 except that a sheet of aluminum foil of 30 μm in thickness was used for the positive conductor member.

EXAMPLE 5

The battery of Example 5 was fabricated in the same manner as that in Example 1 except that a negative conductor member made of a sheet of copper foil of 16 μm in thickness and a positive conductor member made of a sheet of aluminum foil of 20 μm in thickness were laminated with a separator interposed therebetween to replace the conductor in Example 1.

COMPARATIVE EXAMPLE 1

The battery of Comparative Example 1 was fabricated in the same manner as that in Example 1 except that no electric conductor was used.

COMPARATIVE EXAMPLE 2

The battery of Comparative Example 2 was fabricated in the same manner as that in Example 1 except that a negative conductor member made of a sheet of copper foil of 16 μm in thickness and a separator were laminated to replace the conductor in Example 1.

COMPARATIVE EXAMPLE 3

The battery of Comparative Example 3 was fabricated in the same manner as that in Example 1 except that a positive conductor member made of a sheet of aluminum foil of 50 μm in thickness and a separator were laminated to replace the conductor in Example 1.

2. Nail Penetration Test

Method of Testing

The batteries of the above-described group of Examples and that of Comparative Examples, three for each group, were subjected to a nail penetration test after the batteries were charged under the following charge condition of constant current and constant voltage.

(A) Condition of charge: 2.0 A×8 h (constant voltage: 4.1 V)

(B) Condition of charge: 2.0 A×8 h (constant voltage: 4.2 V)

The condition (A) of the above-described conditions of charge is an ordinary condition of charge, whereas the condition (B) is a condition of charge under which the battery in question is overcharged.

The nail penetration test was performed according to Japan Battery Industry Association Specification SBA G 1101 (Guideline for safety assessment of lithium ion secondary battery). An iron nail of 5 mm in diameter, 100 mm in length, and 30 degrees in point angle was used for the test. The penetration of a nail was made at a velocity of 24 mm/sec so as to penetrate the battery under test from the side surface of the battery case.

A K-type thermocouple was fixed to the central portion of the side surface of the battery case (about 10 mm away from the nail penetrating point) to measure the temperature variation during the nail penetration test.

Results and Discussion

Table 1 shows the results which were obtained by the nail penetration tests performed on the batteries of Examples and Comparative Examples. In TABLE 1, the symbol ○ signifies that the safety valve was not opened, the symbol Δ signifies that the safety valve was opened but no smoking (black smoke) occurred, and the symbol × signifies that the excessive heat generation took place, the safety valve was opened, and smoking occurred therefrom.

TABLE 1

|  | Conductor member of negative electrode | Conductor member of positive electrode | Result of nail penetration test A | B |
|---|---|---|---|---|
| Example 1 | Copper foil (16 μm thick) | Aluminum foil (50 μm thick) | ○ | ○ |
| Example 2 | Same as above (16 μm thick) | Same as above (150 μm thick) | ○ | ○ |
| Example 3 | Same as above (16 μm thick) | Same as above (40 μm thick) | ○ | ○ |
| Example 4 | Same as above (16 μm thick) | Same as above (30 μm thick) | ○ | Δ |
| Example 5 | Same as above (16 μm thick) | Same as above (20 μm thick) | ○ | Δ |
| Comparative Example 1 | None | None | x | x |
| Comparative Example 2 | Copper foil (16 μm thick) | None | x | x |
| Comparative Example 3 | None | Aluminum foil (50 μm thick) | x | x |

The results of the nail penetration tests for the batteries which were charged under the condition of charge (A) are as follows. In any case of the batteries of Comparative Examples 1 to 3, rapid temperature elevation was observed immediately after nail penetration, the safety valve was opened, and fume was released from the battery, while the highest temperature on the side surface of the battery case was 400° C. or below. On the other hand, in any case of the batteries of Examples 1 to 5, the highest temperature on the side surface of the battery case was 110° C. or below, and the safety valve was not opened.

The results of the nail penetration tests for the batteries which were charged under the condition of charge (B) are as follows. In any case of the batteries of Comparative Examples 1 to 3, the safety valve was opened and fume was released from the battery, whereas in any case of the batteries of Examples 4 and 5, the highest temperature was 140° C. or below, the safety valve was opened, but fume was not released. In addition, in any case of the batteries of Examples 1 to 3, the highest temperature of the side surface of the battery case was 120° C. or below, and the safety valve was not opened.

From the above results, it has been found that, according to any battery of the present invention, the heat generation during the nail penetration test can be effectively suppressed and the safety can be secured.

In particular, as Examples 1 and 2 show, a remarkable effect was observed in preventing the excessive heat generation, when the thickness of the positive conductor member was made to be larger (1.5 or more times the thickness of the positive current collector, and more preferably twice or more).

In the above-described Examples, the effect of the present invention was verified by making only the positive conductor members be thicker. If the negative conductor members (copper foil) are made to be thicker, the excessive heat generation in a battery can be more reliably performed, since the electric resistance of copper foil itself is so small that the short-circuit current can be more effectively distributed.

The technical scope of the present invention is not limited by the above-described Examples, and it is to be understood that those matters which will be described below, for example, are included in the technical scope of the present invention. In addition, the scope of the present invention encompasses those which are equivalent in scope, function, design and effect of the present invention.

(1) In the present embodiment, the electric power generating element 10 is of the winding configuration. According to the present invention, the configuration of the electric power generating element 10 is not limited to those in the present Examples. Alternatively, the configuration of the electric power generating element 10 may be of the laminated configuration in which a plurality of sheets of the positive current collector 12 and the negative current collector 15 are laminated with separators 17 each interposed between a positive conductor member 21 and a negative conductor member 22. In such a case, belt-like conductors may be wound around the electric power generating element 10. In addition, a sheet-like positive conductor member and a sheet-like negative conductor member may be laminated on each of both outermost side faces of the electric power generating element 10 with a separating member 17 interposed therebetween.

(2) In the present embodiment, the electric conductor 20 which is capable of covering in just proportion the outer circumferential surface 10A of the electric power generating element 10 is wound in a manner so as to come full circle around the electric power generating element 10. According to the present invention, however, the number of conductor sheets which are wound is not limited to those in the present embodiments, and the conductor may be wound in two or more folds. In addition, a long length of a belt-like conductor may be wound in two or more folds.

(3) In the present embodiment, only the positive conductor member 21 is made to be thicker than the positive current collector 12. According to the present invention, however, the thicknesses of the conductor members are not limited to those in the present embodiment. Alternatively, only the negative conductor member 22 may be made to be thicker than the negative current collector 15. In addition, the positive conductor member 21 and the negative conductor member 22 may be made to be thicker than the positive current collector 12 and the negative current collector 15, respectively.

(4) In the present embodiment, the positive conductor member 21 is used as one thick sheet. By using a positive conductor member 21 comprising a plurality of superposed aluminum foil sheets, however, the total thickness of the positive conductor member 21 may be increased. This is also the case for the negative conductor member 22.

(5) In the present embodiment, the electric conductor 20 is wound around the outer circumferential surface 10A of the electric power generating element 10, and further, a sheet of polyimide film 23 is wound around the outer circumferential surface of the electric conductor 20, while the positive conductor member 21 electrode is located outside the electric conductor 20. If the material for the positive conductor member 21 is the same as that for the battery case 3, it is not necessary to wind a sheet of polyimide film 23 around all over the outer circumferential surface 10A of the electric conductor 20 for the purpose of insulating the positive conductor member 21 and the battery case 3 from each other, and the positive conductor member 21 and the battery case 3 may be partially electrically connected to each other.

(6) In the present embodiment, the positive conductor member 21 is arranged in the outer portion of the electric conductor 20, while the negative conductor member 22 is arranged, in the inner portion of the electric conductor 20. It is unnecessary to stick to this arrangement, and thus, the negative conductor member 22 may be arranged in the outer portion of the electric conductor 20, and the positive conductor member 21 may be arranged in the inner portion of the electric conductor 20, so long as the electric conductor 20 and the battery case 3 are insulated from each other.

(7) In the present embodiment, the positive conductor member 21 in the electric conductor 20 is connected to the positive electrode lead plate 34, and the negative conductor member 22 is connected to the negative electrode lead plate 31. In addition to such a connection manner, the positive conductor member 21 may be connected to a portion in the end of the winding of the positive current collector 12, and the negative conductor member 22 may be connected to a portion in the end of the winding of the negative current collector 15.

The invention claimed is:

1. A nonaqueous electrolyte secondary battery comprising:
   a casing;
   an electric power generating element comprising a positive plate provided with a positive current collector and a negative plate provided with a negative current collector, said positive plate and said negative plate being laminated on each other with a first separating member interposed therebetween; and
   an electric conductor comprising a positive conductor member electrically connected to said positive current collector and a negative conductor member electrically connected to said negative current collector, said positive conductor member and said negative conductive member being laminated on each other with a second separating member interposed therebetween;
   wherein said electric power generating element is housed in said casing, and an outer circumferential surface of said electric power generating element is covered with said electric conductor; and
   wherein an electric resistance per unit length of said positive conductor member is smaller than an electric resistance per unit length of said positive current collector electrically connected to said positive conductor member, or an electric resistance per unit length of said negative conductor member is smaller than an electric resistance per unit length of said negative current collector electrically connected to said negative conductor member.

2. The nonaqueous electrolyte secondary battery according to claim 1, wherein:
   said electric power generating element comprises said positive plate and said negative plate wound together with said first separating member interposed therebetween; and
   said casing is of an elliptic cylindrical shape.

3. The nonaqueous electrolyte secondary battery according to claim 1, wherein the electric resistance per unit length of said positive conductor member is equal to or smaller than one-half the electric resistance per unit length of said positive current collector electrically connected to said positive conductor member, or the electric resistance per unit length of said negative conductor member is equal to or smaller than one-half the electric resistance per unit length of said negative current collector electrically connected to said negative conductor member.

4. A nonaqueous electrolyte secondary battery according to claim 1, further comprising:
   a positive lead plate having one end electrically connected to said positive current collector and another end connected to a positive electrode terminal; and
   a negative lead plate having one end electrically connected to said negative current collector and another end connected to a negative electrode terminal;
   wherein said positive conductor member is electrically connected to said positive lead plate, and said negative conductor member is electrically connected to said negative lead plate.

5. The nonaqueous electrolyte secondary battery according to claim 4, wherein:
   said positive current collector and said positive conductor member are made of aluminum foil; and
   a thickness of said positive conductor member is larger than a thickness of said positive current collector.

6. The nonaqueous electrolyte secondary battery according to claim 5, wherein:
   said casing is made of aluminum or an aluminum alloy;
   said positive conductor member is arranged in an outer circumferential side of said electric conductor; and
   said positive conductor member and said casing are electrically connected with each other.

7. The nonaqueous electrolyte secondary battery according to claim 5, wherein the thickness of said positive conductor member is at least twice the thickness of said positive current collector.

8. The nonaqueous electrolyte secondary battery according to claim 4, wherein:
   said negative current collector and said negative conductor member are made of copper foil; and
   a thickness of said negative conductor member is larger than a thickness of said negative current collector.

9. The nonaqueous electrolyte secondary battery according to claim 8, wherein the thickness of said negative conductor member is at least twice the thickness of said negative current collector.

10. The nonaqueous electrolyte secondary battery according to claim 4, wherein:
    said electric power generating element comprises said positive plate and said negative plate wound together with said first separating member interposed therebetween; and
    said casing is of an elliptic cylindrical shape.

11. The nonaqueous electrolyte secondary battery according to claim 4, wherein the electric resistance per unit length of said positive conductor member is equal to or smaller than one-half the electric resistance per unit length of said positive current collector electrically connected to said positive conductor member, or the electric resistance per unit length of said negative conductor member is equal to or smaller than one-half the electric resistance per unit length of said negative current collector electrically connected to said negative conductor member.

12. A nonaqueous electrolyte secondary battery comprising:
    a casing;
    an electric power generating element comprising a positive plate provided with a positive current collector and a negative plate provided with a negative current collector, said positive plate and said negative plate being laminated on each other with a first separating member interposed therebetween; and
    an electric conductor comprising a positive conductor member electrically connected to said positive current collector and a negative conductor member electrically connected to said negative current collector, said positive conductor member and said negative conductive member being laminated on each other with a second separating member interposed therebetween;
    wherein said electric power generating element is housed in said casing, and an outer circumferential surface of said electric power generating element is covered with said electric conductor; and wherein an electric resistance per unit length of said positive conductor member is smaller than an electric resistance per unit length of said positive current collector electrically connected to said positive conductive member, or an electric resistance per unit length of said negative conductor member is smaller than an electric resistance per unit length of said negative current collector electrically connected to said negative conductor member;

wherein said positive current collector and said positive conductor member are made of aluminum foil; and wherein a thickness of said positive conductor member is larger than a thickness of said positive current collector.

13. The nonaqueous electrolyte secondary battery according to claim 12, wherein:

said casing is made of aluminum or an aluminum alloy;

said positive conductor member is arranged in an outer circumferential side of said electric conductor; and said positive conductor member and said casing are electrically connected with each other.

14. The nonaqueous electrolyte secondary battery according to claim 12, wherein the thickness of said positive conductor member is twice the thickness of said positive current collector.

15. A nonaqueous electrolyte secondary battery comprising:

a casing;

an electric power generating element comprising a positive plate provided with a positive current collector and a negative plate provided with a negative current collector, said positive plate and said negative plate being laminated on each other with a first separating member interposed therebetween; and an electric conductor comprising a positive conductor member electrically connected to said positive current collector and a negative conductor member electrically connected to said negative current collector, said positive conductor member and said negative conductive member being laminated on each other with a second separating member interposed therebetween;

wherein said electric power generating element is housed in said casing, and an outer circumferential surface of said electric power generating element is covered with said electric conductor; and wherein an electric resistance per unit length of said positive conductor member is smaller than an electric resistance per unit length of said positive current collector electrically connected to said positive conductor member, or an electric resistance per unit length of said negative conductor member is smaller than an electric resistance per unit length of said negative current collector electrically connected to said negative conductor member;

wherein said negative current collector and said negative conductor member are made of copper foil; and wherein a thickness of said negative conductor member is larger than a thickness of said negative current collector.

16. The nonaqueous electrolyte secondary battery according to claim 15, wherein the thickness of said negative conductor member is twice the thickness of said negative current collector.

* * * * *